United States Patent [19]

Hagelin

[11] Patent Number: 4,826,186
[45] Date of Patent: May 2, 1989

[54] HAND-PUSHED CARRIER TROLLEY

[75] Inventor: Kunto Hagelin, Jarvenpaa, Finland

[73] Assignee: Ostosvaunuhuolto Oy, Jarvenpaa, Finland

[21] Appl. No.: 111,160

[22] Filed: Oct. 22, 1987

[30] Foreign Application Priority Data

Oct. 23, 1986 [FI] Finland .................................. 864290

[51] Int. Cl.$^4$ .......................... B62B 3/00; B62D 39/00
[52] U.S. Cl. ............................ 280/33.994; 280/47.16; 280/33.996
[58] Field of Search ................. 280/33.99 H, 33.99 R, 280/33.99 F, 47.16, 79.2, 33.99 C, 33.99 A, 47.2

[56] References Cited

U.S. PATENT DOCUMENTS

| | | | |
|---|---|---|---|
| 2,216,972 | 10/1940 | Gibson et al. | 280/47.16 |
| 2,590,285 | 3/1952 | Wiltshire | 280/33.99 H |
| 2,903,269 | 9/1959 | Hennion | 280/33.99 H |
| 2,992,010 | 7/1961 | Sides | 280/33.995 |
| 3,337,227 | 8/1967 | Castaldo | 280/33.99 H |
| 4,039,224 | 8/1977 | Bauer et al. | 280/745 |
| 4,281,853 | 8/1981 | LeVeux | 280/804 |
| 4,394,036 | 7/1983 | Hildebrandt | 280/804 |
| 4,456,283 | 6/1984 | Michael et al. | 280/804 |
| 4,580,800 | 4/1986 | Upton et al. | 280/33.99 C |
| 4,597,588 | 7/1986 | Kawai | 280/808 |

FOREIGN PATENT DOCUMENTS

| | | |
|---|---|---|
| 0048135 | 3/1982 | European Pat. Off. . |
| 3442124 | 5/1986 | Fed. Rep. of Germany ... 280/33.99 C |
| 365646 | 9/1906 | France . |
| 1323689 | 3/1963 | France . |
| 2420468 | 10/1979 | France . |
| 2052399 | 1/1981 | United Kingdom . |

Primary Examiner—Charles A. Marmor
Assistant Examiner—Brian L. Johnson
Attorney, Agent, or Firm—Young & Thompson

[57] ABSTRACT

The hand trolley has a bottom frame equipped with a front pair of swiveling wheels, a rear pair of swiveling wheels and one or two non-swiveling central wheels located at a lower level than the plane defined by the front and rear pairs of wheels. The bottom frame of the trolley is constituted by two lateral bars and two central bars placed respectively on opposite sides of the longitudinal plane of symmetry of the trolley, the rear ends of the central bars being closer to the plane of symmetry than the front ends and the bottom frame being thus M-shaped when viewed from the rear. The central wheels are placed beneath the central bars while the front wheels are placed at the same location as the common front ends of the lateral bars and of the central bars, the rear wheels being placed at the same location as the rear ends of the lateral bars.

2 Claims, 3 Drawing Sheets

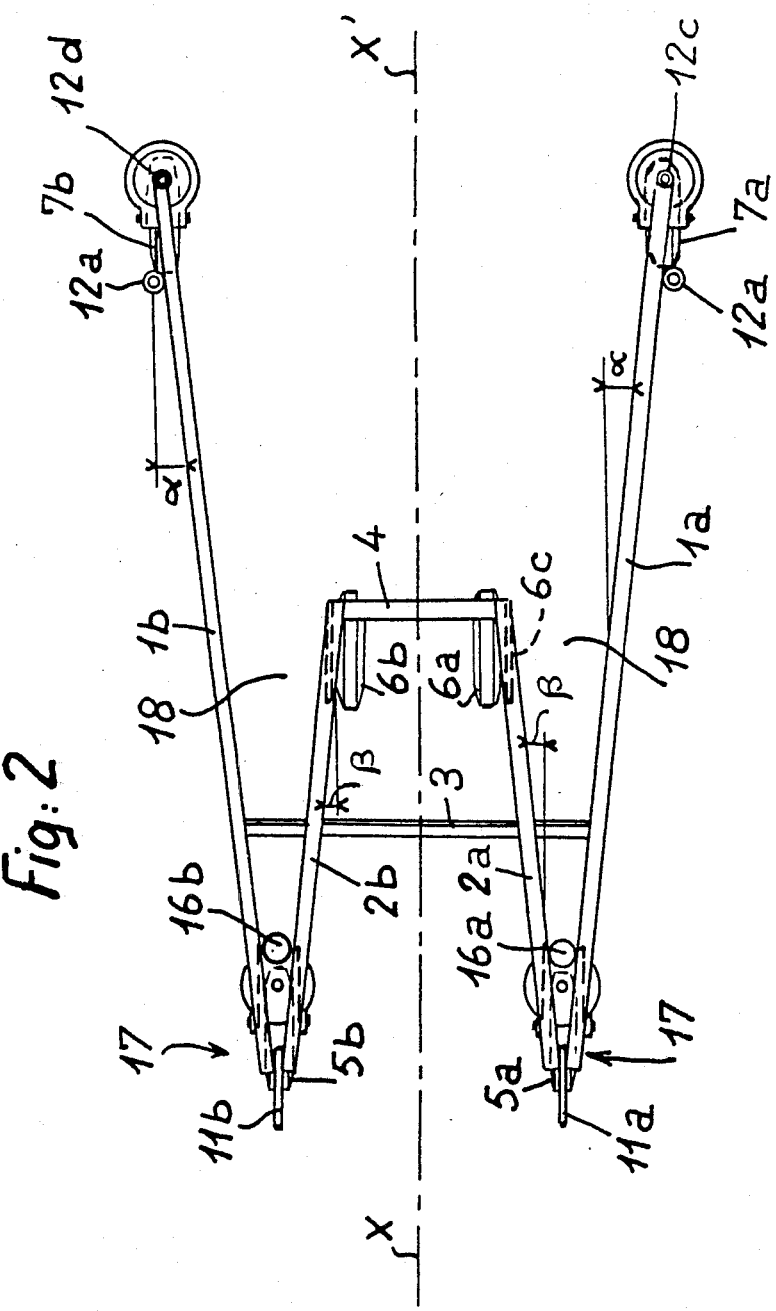

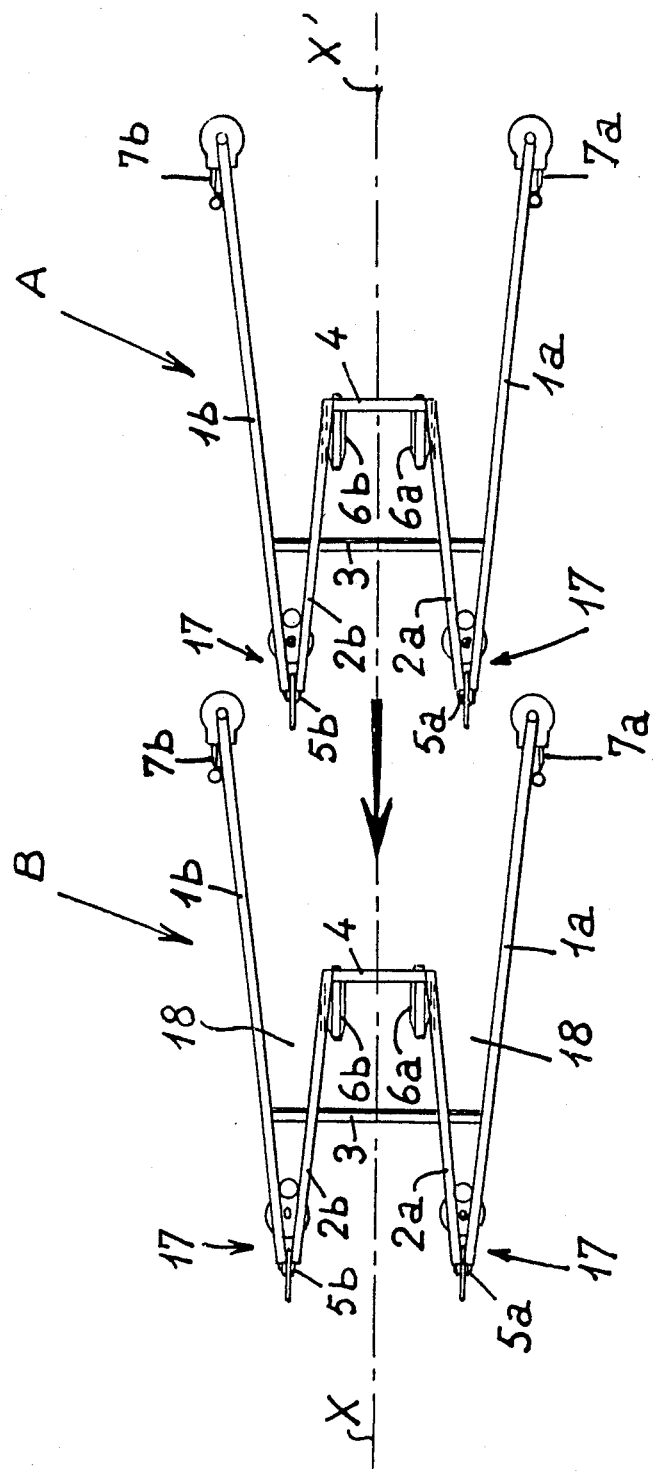

HAND-PUSHED CARRIER TROLLEY

BACKGROUND OF THE INVENTION

1. Field of the Invention

This invention relates to a hand-pushed carrier trolley which is intended to be employed for transporting merchandize, in particular in wholesale self-service stores as well as in warehouses of retail stores.

2. Description of the Prior Art

Hand-pushed carrier trolleys are used under widely varying service conditions and there are consequently many different types of trolleys in existence.

One type of carrier trolley in general use is the trolley employed in commercial stores and having four wheels which are all free to swivel about a vertical axis. The advantage of these carrier trolleys is that their frames can be so designed as to fit one inside the other in order to group the trolleys together in a small volume when they are not in use. To this end, instead of being carried by a bottom platform, the trolley wheels are secured to the four corners of a horizontal peripheral member having the shape of a trapezoid, the large base of which is located at the rear end and completely open in order to permit engagement of another identical trolley. However, these trolleys are subject to a disadvantage in that they are difficult to steer since they have a tendency to run in an undesired direction. This tendency is aggravated as the load on the trolley becomes greater. Attempts have been made to overcome this disadvantage in the case of four-wheeled trolleys by giving freedom of pivotal motion only to the rear pair of wheels. However, trolleys designed on this principle have a long turning radius and are consequently not readily maneuverable.

There also exists another type of trolley in which it is sought to achieve greater maneuverability by means of a pair of non-swiveling central wheels in addition to two pairs of swiveling wheels located respectively at the front and rear ends, these central wheels being placed at a lower level than the front and rear wheels. These trolleys are particularly easy to maneuver since they pivot on the central pair of wheels and can readily be directed even if they are heavily loaded. The defect of these carrier trolleys, however, lies in the fact that they do not engage one inside the other and consequently entail the need for considerable storage space. In order to permit the presence of central wheels, it is in fact necessary to provide trolleys of this type with a bottom platform beneath which these central wheels are fixed. This accordingly excludes any possibility of interengagement of trolleys of this type.

SUMMARY OF THE INVENTION

The object of the present invention is to remove the disadvantages mentioned in the foregoing and to provide a carrier trolley which is highly maneuverable while nevertheless permitting engagement with other identical trolleys.

The trolley in accordance with the invention has a bottom frame equipped with a front pair of swiveling wheels and a rear pair of wheels which are also capable of swiveling as well as one or two non-swiveling central wheels located at a lower level than the plane defined by the front and rear pairs of wheels, this trolley being distinguished by the following features:

the bottom frame of the trolley is constituted by two lateral bars which are placed on the opposite sides of the longitudinal plane of symmetry of the trolley, and two central bars fixed at the front ends thereof on the front ends of the lateral bars, said central bars being placed on the opposite sides of the longitudinal plane of symmetry of the trolley so as to ensure that the rear ends of the central bars are closer to the plane of symmetry than the front ends thereof and that the bottom frame thus assumes rear;

the central wheels aforesaid are placed beneath the central bars while the front wheels are placed at the same location as the common front ends of the lateral bars and of the central bars, the rear wheels being placed at the same location as the rear ends of the lateral bars.

Thus the particular structure of the bottom frame of the trolley under consideration makes it possible in spite of the presence of the central wheels to engage a plurality of trolleys of this type one inside the other in the same manner as trolleys in which no provision is made for central wheels. Under these conditions, the good characteristics of known trolleys are combined in the carrier trolley in accordance with the invention, namely good maneuverability as well as the possibility of interengagement of trolleys.

In an advantageous form of construction, the bottom frame of the trolley in accordance with the invention is adapted to support a loading platform beneath which lifting devices are provided for maintaining the rear portion of the platform at a higher level than the front portion when the platform is not loaded.

BRIEF DESCRIPTION OF THE DRAWINGS

One example of construction of the trolley in accordance with the invention is described hereinafter with reference to the accompanying drawings, in which:

FIG. 2 is a top view of the bottom frame of said carrier trolley;

FIG. 3 is a diagram illustrating the mode of interengagement of two trolleys of this type.

DESCRIPTION OF THE PREFERRED EMBODIMENT

Figure 1:
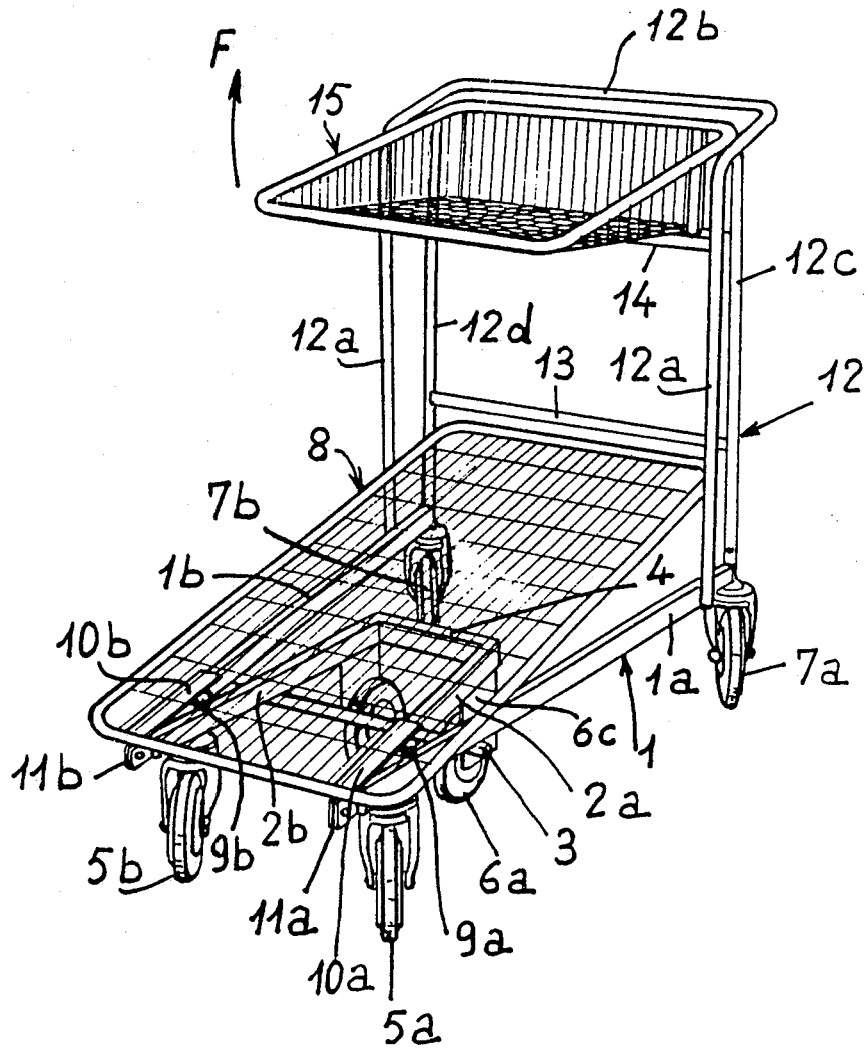
FIG. 1 is a perspective view of a carrier trolley in accordance with the invention.

The carrier trolley in accordance with the invention and shown in FIG. 1 is intended to be pushed by hand. This trolley is provided in the first place with a bottom frame on which are fixed the three pairs of wheels provided. The frame is made up of two pairs of bars disposed in a horizontal or approximately horizontal plane, namely two lateral bars 1a and 1b and two central bars 2a and 2b. The frame also includes a cross-tube 3 and a cross-member 4. The cross-tube 3 is placed at the front end in order to provide a connection between the lateral bars and the central bars whereas the cross-member 4 provides a connection between the rear ends of the central bars.

The swiveling wheels 5a and 5b of the front pair of wheels are fixed beneath the common front ends of the lateral and central bars. In regard to the nonswiveling wheels 6a and 6b of the central pair of wheels, these wheels are fixed by means of side-plates 6c beneath the rear ends 2a and 2b of the central bars. Finally, the swiveling wheels 7a and 7b of the rear pair of wheels are fixed beneath the rear ends of the lateral bars 1a and 1b. The central pair of wheels is mounted in accordance with a known method so as to be located at a slightly lower level than the plane determined by the front and rear wheels. The front wheels 5a and 5b of the trolley are thus slightly raised above ground level.

The trolley frame 1 is adapted to support a bottom latticework loading platform 8 which, in the non-loaded state, is located in the position shown in FIG. 1 so that the rear portion of this latter is higher than its front portion. To this end, provision is made for coil springs 9a and 9b interposed between bearing plates 10a, 10b carried by the loading platform 8 and bearing members 16a and 16b (as shown in FIG. 2) which are fixed between the lateral bars and the central bars behind the front wheels 5a and 5b. Moreover, the front end of the loading platform 8 is pivotally mounted on supports 11a and 11b placed between the lateral and central bars. The coil springs 9a and 9b thus have the function of upwardly displacing the rear portion of the loading plane when the load is removed from the loading platform 8.

On the rear portion of the bottom frame 1 of the carrier trolley is fixed a ladder structure 12 which is essentially vertical. This structure is formed by a tube 12a fixed on the lateral bars 1a and 1b in front of the rear wheels. The upper end of said tube 12a is bent-back so as to form a handle-bar 12b. The vertical tubes 12c and 12d of this structure are fixed between the lateral bars 1a and 1b and the portions of the tube 12a which extend in the rearward direction. A cross-tube 13 connects the two tubes 12c and 12d in order to reinforce the structure and to serve as a top end-of-travel stop for the rear portion of the loading platform 8 when this latter undergoes an upward displacement.

The vertical portions of the tube 12a are connected together by a cross tube 14 on which rests a top basket 15. The bottom wall of the basket is rearwardly inclined at a small angle of slope and the rear end of the bottom wall is pivotally mounted on the tubes 12c and 12d. In consequence, the top basket can be pivoted upwards to an essentially vertical position in the direction of the arrow F. This pivotal displacement is necessary in order to ensure that the trolleys can be engaged one inside the other.

The structure which constitutes the bottom frame 1 of the trolley is shown in greater detail in FIG. 2. The plane of symmetry in the longitudinal direction of the carrier trolley is designated by the reference X-X'. As already mentioned with reference to FIG. 1, two lateral bars 1a and 1b form part of the bottom frame. These lateral bars are placed on the opposite sides of the longitudinal plane of symmetry X-X' of the trolley in such a manner as to ensure that the front ends of said bars are closer to the plane of symmetry than their rear ends. The frame consequently narrows in the shape of a wedge towards the front end. The central bars 2a and 2b extend in the rearward direction from the front ends of the lateral bars. Said central bars are disposed on the opposite sides of the plane of symmetry in such a manner as to ensure that their rear ends are closer to the plane of symmetry than their front ends.

Thus the horizontal bottom frame 1 assumes the general shape of an M when observed from the rear. The frame therefore has two pointed ends 17 which project in the forward direction and ia provided on each side with two free spaces 18 which are open in the rearward direction, each space being located between a lateral bar 1a or 1b and the adjacent central bar 2a or 2b.

The angle made with the direction of the plane of symmetry X-X' by the lateral bars 1a and 1b is designated as $\alpha$ and the corresponding angle made with the plane of symmetry by the central bars 2a and 2b is designated as $\beta$. The angles $\alpha$ and $\beta$ will advantageously have the same value, that is, approximately 6 degrees.

The rear ends of the central bars 2a and 2b are connected to each other by means of the cross-bar 4. Provision is also made between the front portion of the frame and the cross-bar 4 for a cross-tube 3 which has been placed beneath the lateral and central bars in order to join them together.

FIG. 2 also illustrates, between the central and lateral bars, the bearing members 16a and 16b which are located behind the vertical axes of the front wheels and on which the coil springs 9a and 9b (shown in FIG. 1) are applied in order to produce an upward displacement of the loading platform 8. It is also clearly apparent from FIG. 2 that the distance between the front wheels is shorter than the distance between the rear wheels and that the distance between the central wheels is shorter than the distance between the front wheels.

FIG. 2 also shows how the particular structure of the bottom frame 1 produces unrestricted conditions for engagement of one carrier trolley of this type within another. Prior to engagement, the top basket 15 is lifted vertically so as to ensure that it does not catch in the following trolley. As illustrated in FIG. 3, the trolleys A and B penetrate lengthwise one inside the other in such a manner as to ensure that the two pointed front ends 17 of the bottom frame of the rear trolley A can be engaged within the two free spaces 18 which open towards the rear on the bottom frame 1 of the front trolley B. During this interengagement operation, the cross-tube 3 of the rear trolley B comes into contact with the side-plates 6b and 6c which form part of the front trolley A and serve to fix the central wheels on the rear ends of the central bars. There thus remains a small space between the cross-tube 3 of the preceding (front) trolley and the front-wheel assembly of the following (rear) trolley. This feature is important for ensuring that the bearings of the front wheels are not damaged at the moment of interengagement of trolleys.

Although the invention has been described in the foregoing with reference to the single example shown in the accompanying drawings, it remains apparent that the invention is not limited to this example but can be modified in many different ways within the scope of the constructional design in accordance with the invention. From this it follows, for example, that the angles $\alpha$ and $\beta$ made with the longitudinal plane of symmetry of the trolley by the lateral and central bars can have a different value. Similarly, the design and shape of the structure 12 and of the top basket 15 can be modified in many different ways without thereby departing either from the scope or the spirit of the invention.

It is worthy of note in this connection that each wheel of each pair of wheels can be replaced by a pair of twin wheels. If so required, the two separate central wheels 6a, 6b could be replaced by a single central wheel mounted beneath the center of the cross-member 4.

As already mentioned, the distinctive design in accordance with the present invention ensures excellent maneuverability of the trolley by virtue of the central wheels while nevertheless permitting interengagement with other identical trolleys. However, a further advantage offered by the central wheels 6a, 6b lies in the fact that this trolley is accordingly permitted to carry much heavier loads than a trolley provided simply with a front pair of wheels and a rear pair of wheels.

What is claimed is:

1. A hand-pushed carrier trolley having a bottom frame equipped with front and rear pairs of swiveling wheels and a pair of central wheels located at a lower level than the plane defined by the front and rear pairs of wheels, the improvement wherein
   (a) said bottom frame comprises
      (1) two lateral bars placed on opposite sides of the longitudinal plane of symmetry of the trolley and diverging from said plane at an angle $\alpha$ in the direction of the rear of the trolley;
      (2) two central bars connected at the front ends thereof with the front ends of said lateral bars, said central bars being placed on opposite sides of the longitudinal plane of symmetry and converging toward said plane at an angle $\beta$ in the direction of the rear of the trolley, said angles $\alpha$ and $\beta$ having essentially the same value; that the rear ends of the central bars are closer to the plane of symmetry than the front ends thereof;
      (3) a cross-bar connected between the rear ends of said central bars, whereby the bottom frame has an M-shaped configuration when viewed from the upper rear of the trolley;
      (4) the spaces between said central and lateral bars being rearwardly open and unimpeded for a substantial distance along said bars, whereby said trolley is partially nestable with an identical second trolley in a front-to-rear direction; and
   (b) said central wheels being connected beneath said central bars with the rear portions thereof, respectively, said front wheels being connected with the common front ends of said lateral and central bars, respectively, and said rear wheels being connected with the rear ends of said lateral bars, respectively.

2. A carrier trolley as defined in claim 1, and further comprising a loading platform and means for connecting said loading platform with said bottom frame, said loading platform including bearing plates and said frame including bearing members arranged between said lateral and central bars, said connecting means comprising coil springs connected between said bearing plates and said bearing members, respectively, for normally maintaining the rear portion of said loading platform at a higher level than the front portion of said platform when said platform is not loaded.

* * * * *